(12) United States Patent
Meron (10) Patent No.: US 12,400,556 B1
(45) Date of Patent: Aug. 26, 2025

(54) TACTILE GUIDANCE SYSTEM FOR STRING INSTRUMENTS

(71) Applicant: Maya Meron, Bloomington, IN (US)

(72) Inventor: Maya Meron, Bloomington, IN (US)

( * ) Notice: Subject to any disclaimer, the term of this patent is extended or adjusted under 35 U.S.C. 154(b) by 0 days.

(21) Appl. No.: 19/215,917

(22) Filed: May 22, 2025

Related U.S. Application Data (60) Provisional application No. 63/713,760, filed on Oct. 30, 2024.

(51) Int. Cl.
*G09B 15/00* (2006.01)
*G10G 1/02* (2006.01)

(52) U.S. Cl.
CPC .............. *G09B 15/00* (2013.01); *G10G 1/02* (2013.01)

(58) Field of Classification Search
CPC .................................. G09B 15/00; G10G 1/02
See application file for complete search history.

(56) References Cited

U.S. PATENT DOCUMENTS

| | | | |
|---|---|---|---|
| 3,987,700 A | 10/1976 | Dunlap | |
| 5,345,851 A | 9/1994 | Aalfs | |
| 6,218,603 B1 * | 4/2001 | Coonce | G09B 15/06 84/485 R |
| 7,714,220 B2 | 5/2010 | Festejo | |
| 8,242,345 B2 * | 8/2012 | Elion | G10H 1/0066 84/646 |
| 9,012,753 B2 | 4/2015 | Booth | |
| 9,653,047 B2 * | 5/2017 | Chen | G10D 3/06 |
| 10,339,829 B2 | 7/2019 | Grafman | |
| 10,643,585 B1 * | 5/2020 | Geeslin | G10D 1/05 |
| 2009/0260508 A1 * | 10/2009 | Elion | G10H 1/0066 84/646 |
| 2021/0074174 A1 | 3/2021 | Weston | |

FOREIGN PATENT DOCUMENTS

| | | |
|---|---|---|
| DE | 3100676 A1 | 4/1982 |
| GB | 302528 A | 12/1928 |
| GB | 317942 A | 8/1929 |
| GB | 2402259 B | 12/2007 |

* cited by examiner

*Primary Examiner* — Robert W Horn
(74) *Attorney, Agent, or Firm* — Neustel Law Offices (57) ABSTRACT

A tactile guidance system for string instruments is used to teach correct finger position on a string of a string instrument to produce a desired musical note with correct pitch and intonation. The system includes an upper band support structure positioned about an upper end of a fingerboard, a lower support structure positioned about a lower end of the fingerboard, and a tactile band secured between the support structures and positioned above an underlying string. The tactile band includes a tactile indicator that is depressible by a finger of a user causing depression of the tactile band and causing depression of the underlying string against the fingerboard at a predetermined musical note position. The system can also include a bow barrier coupled to the lower band support structure to assist in positioning a bow used to play the instrument at a desired angle.

20 Claims, 9 Drawing Sheets

FIG. 12

TACTILE GUIDANCE SYSTEM FOR STRING INSTRUMENTS

CROSS REFERENCE TO RELATED APPLICATIONS

I hereby claim benefit under Title 35, United States Code, Section 119(e) of United States provisional patent application Ser. No. 63/713,760 filed Oct. 30, 2024. The 63/713,760 application is currently pending. The 63/713,760 application is hereby incorporated by reference into this application.

STATEMENT REGARDING FEDERALLY SPONSORED RESEARCH OR DEVELOPMENT

Not applicable to this application.

BACKGROUND

The example embodiments described herein are generally directed to the field of music education and more specifically directed to tactile guidance systems for string instruments to teach correct finger placement on strings of an instrument to produce a desired note.

String instruments present a unique challenge to the beginning musical student in that correct finger position to repeatably achieve a desired note from the instrument is not indicated on the instrument itself but, rather, is only learned through extensive sessions of trial and error. The learning curve to correct finger position proficiency is long, can cause student frustration, and can even cause a student to give up on learning how to play the instrument. A system that will shorten the learning curve to correct finger position proficiency is needed to encourage continued practice by beginning students.

SUMMARY

Some of the various embodiments of the present disclosure relate to tactile guidance systems for string instruments that will help a beginning student musician to quickly learn correct finger placement on the strings of the instrument to produce a desired note.

A tactile guidance system for string instruments generally includes an upper band support structure positioned about an upper end of a fingerboard of the instrument, a lower support structure positioned about a lower end of the fingerboard, and one or more tactile bands secured between the upper and lower support structures. In its position between the upper and lower support structures, the tactile bands are respectively located above an underlying string of the instrument. The tactile bands include one or more tactile indicators that are depressible by a finger of a user. The depression of the one or more tactile indicators causes depression of the tactile band and, subsequently, causes depression of the underlying string against the fingerboard of the instrument at a predetermined, correct musical note position. In certain embodiments, the tactile guidance system can also include a bow barrier that is coupled to the lower band support structure. The position of the bow barrier atop a body of the instrument is used to assist a student in positioning a bow used to play the instrument at a desired angle.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in their application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Some of the various embodiments of the present disclosure relate to a tactile guidance system for string instruments. The tactile guidance system is used to teach finger position on a string of the instrument to produce a desired musical note with correct pitch and intonation. The tactile guidance system for string instruments reduces the amount of time typically needed to learn correct finger positioning for a string instrument.

The tactile guidance system for string instruments 10 described herein is described in reference to various known elements of a string instrument 12. These known elements are illustrated in the drawings and include a body 11, a scroll 13, a peg box 14, pegs 15, a neck 16, a fingerboard (or fretboard dependent upon the string instrument 12) 17, a bridge 18, and a plurality of strings 19. The fingerboard 17 includes an upper end 17a proximate the peg box 14 that is supported by the neck 16 of the string instrument 12. The fingerboard 17 also includes a lower end 17b that is positioned atop the body 11 of the string instrument 12. The term "fretboard" is interchangeable as item number 17 with the term "fingerboard" dependent upon the type of string instrument being referenced. String instruments 12 include, but are not limited to, violins, violas, cellos, double basses, guitars, banjos, and ukeleles.

A tactile guidance system for string instruments 10 generally includes an upper band support structure 20, a lower band support structure 40, and a tactile band 60. The upper band support structure 20 is positioned about a plurality of strings 19 and an upper end 17a of a fingerboard 17 of the string instrument 12. The lower band support structure 40 is positioned about the plurality of strings 19 and about a lower end 17b of the fingerboard 17 of the string instrument 12. The tactile band 60 is secured between the upper band support structure 20 and the lower band support structure 40. The tactile band 60 is additionally suspended above an underlying one of the plurality of strings 19 and includes a tactile indicator 63. The tactile indicator 63 is individually depressible by a finger of a user thereby causing depression of the tactile band 60 and causing depression of the underlying string 19 against the fingerboard 17 at a predetermined musical note position.

In certain embodiments, the tactile guidance system for string instruments 10 includes a plurality of tactile bands 60 secured between the upper band support structure 20 and the lower band support structure 40 where the number of tactile bands can match or be less than the number of strings 19 on the string instrument 12.

In certain embodiments, the tactile band 60 includes a plurality of tactile indicators where at least a portion of the tactile indicators 63 represent a corresponding plurality of predetermined musical note positions. The plurality of tactile indicators 63 may be of the same or different shapes/textures and can also include a visual indication such as a color or shape.

In certain embodiments, a first end of the tactile band 60 is secured at a notch of the upper band support structure 20 while the second end of the tactile band 60 is secured at a notch of the lower support structure 40. In other embodiments, the first end of the tactile band 60 is secured at the upper band structure 20 with a first band clamp 29 while the second end of the tactile band 60 is secured at the lower and structure with a second band clamp 49. The first band clamp 29 and the second band clamp 49 may be magnetically couplable to the upper band support structure 20 and the lower band support structure 40, respectively.

In certain embodiments, the tactile guidance system for string instruments 10 additionally includes a bow barrier 70. The bow barrier 70 is coupled to the lower band support structure 40 in a position above the body 11 of the string instrument 12 and assists a user in positioning a bow used to play the string instrument 12 at a predetermined angle. The bow barrier 70 can include a second portion 81 that, along with the bow barrier 70 itself, defines a channel through which a bow used to play the string instrument 12 can be drawn.

B. Upper Band Support Structure

FIGS. 1-6 illustrate an example embodiment of the upper band support structure 20 of the tactile guidance system for string instruments 10, which is preferably of a unitary configuration and is fabricated from a plastic material such as, without limitation, one or more of polypropylene, polyethylene, polystyrene, polyvinyl chloride, polycarbonate, polyethylene terephthalate, and/or synthetic or semi-synthetic materials that can produce the upper band support structure with desired levels of rigidity and flexibility for removably or fixedly securing about (i.e., around or substantially around) a string instrument 12; rubber, metal, and wood are also possible materials.

The upper band support structure 20 of FIGS. 1-6 has an upper cross portion 21 in a substantially horizontal orientation, with an arched or flat upper surface corresponding to the shape of the fingerboard/fretboard 17, that is supported by a first side member 23 and a second side member 24, each of which is oriented substantially perpendicularly to the upper cross portion 21. A first wrap portion extends outward from a lower end of the first side member 23 in a horizontal orientation toward a second wrap portion 26 that extends in a horizontal orientation from the second side member 24; the first wrap portion is not shown but is the same as the second wrap portion 26 in an opposing orientation.

Notably a gap is provided between the first wrap portion and the second wrap portion 26 such that the first side member 23 and the second side member 24 can be flexed outward and away from one another to accommodate a width of a neck 16 of a string instrument 12, such as the violin shown in the Figures. The flexing of the first side member 23 and the second side member 24 enables the upper band support structure 20 to be positioned at the upper end 17a of the fingerboard 17 about the neck 16 of the string instrument 12 with the first wrap portion and the second wrap portion 26 returning from flexing to a position below and in contact with the underside of the neck 16; the first side member 23 and the second member 24 return to positions immediately proximate the sides of the neck 16 and the upper cross portion 21 is placed in a position above the neck 16 and above the strings 19 of the string instrument 12. The final location of the upper band support structure is near the peg box 14 in a position relative to the string instrument 12 that enables desired finger placement on the fingerboard 17 for producing a desired musical note.

In FIGS. 1-6, the upper cross portion 21 of the upper band support structure 20 is provided with one or more notches 28 about which an end of the tactile band 60 can be wrapped and secured within. In other embodiments, see, for example, FIG. 7, the notches are eliminated and the upper cross portion 21 is provided with an un-notched surface about which the end of the tactile band 60 is wrapped. A band clamp 29, seen in FIGS. 7 and 11, can be used in conjunction with the notched or un-notched upper cross portion 21 to further secure the end of the tactile band 60 at the upper band support structure 20. The illustrated band clamp 29 is generally an inverted u-shaped plastic component that slides over the end of the tactile band 60 in an interference fit allowing for removal and/or replacement of the band clamp 29. The band clamp 29 may include a tacky or textured surface to enhance its grip about the end of the tactile band 60 and upper cross portion 21. The upper band support structure 20 itself may also include a tacky or textured surface to enhance its grip about the fingerboard 17.

Figure 1:
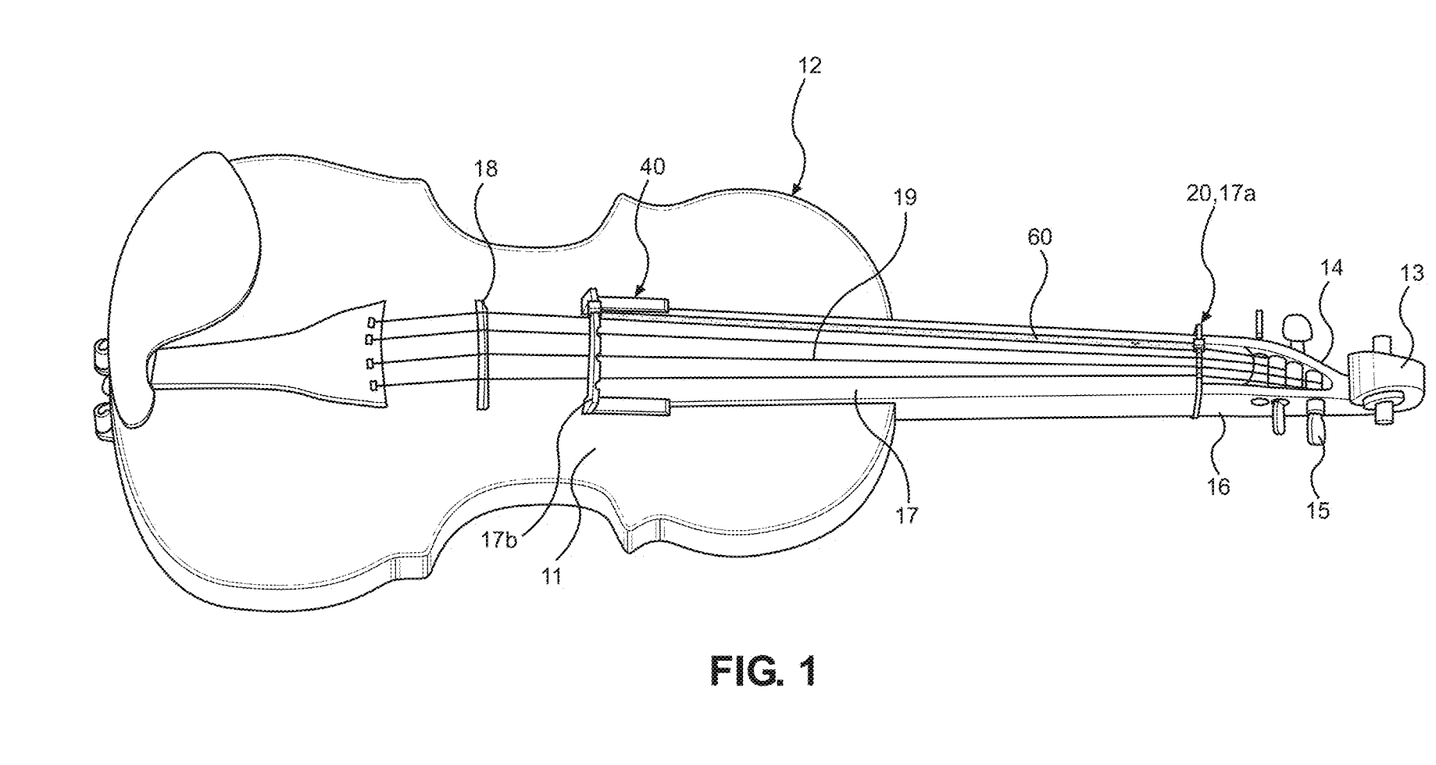
FIG. 1 is a top view of a tactile guidance system for string instruments as applied to a string instrument in accordance with an example embodiment.
Figure 2:
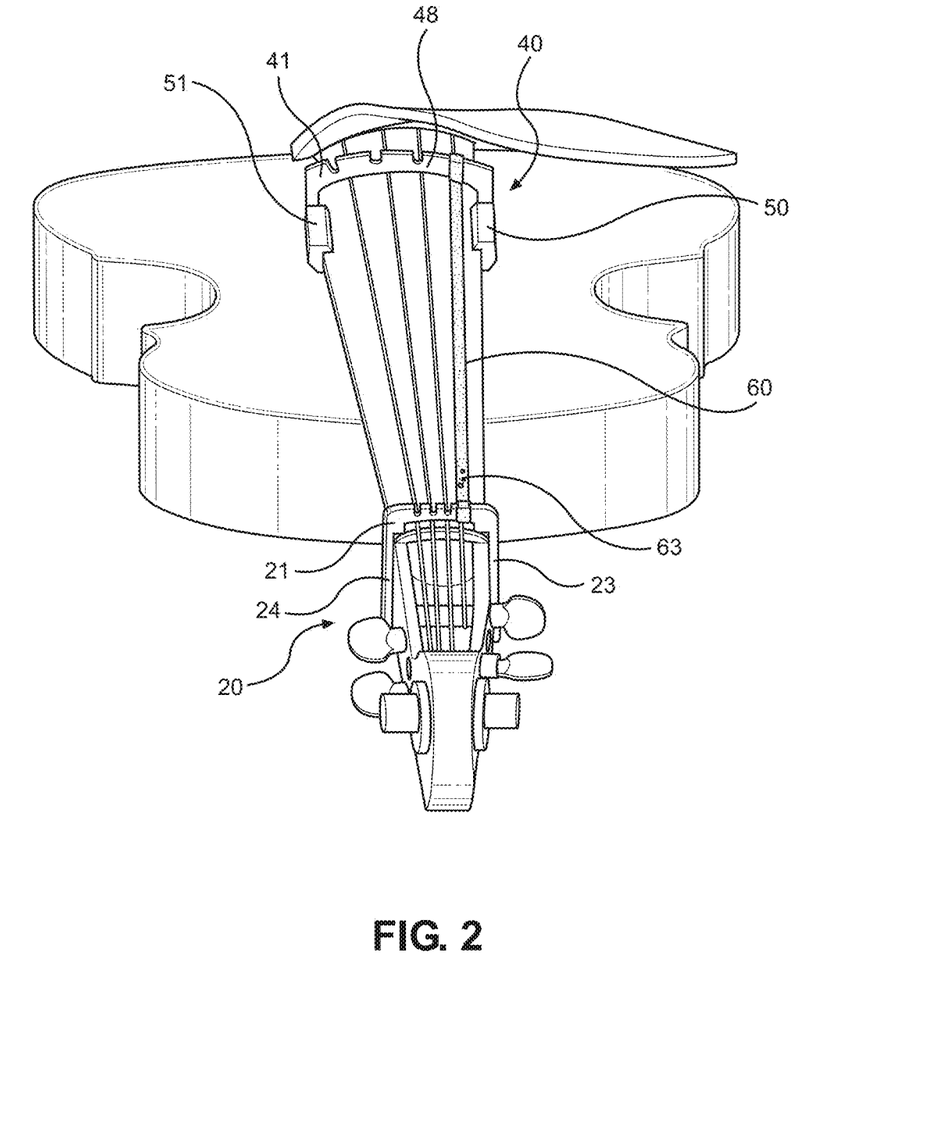
FIG. 2 is a front view of the tactile guidance system for string instruments of FIG. 1.
Figure 3:
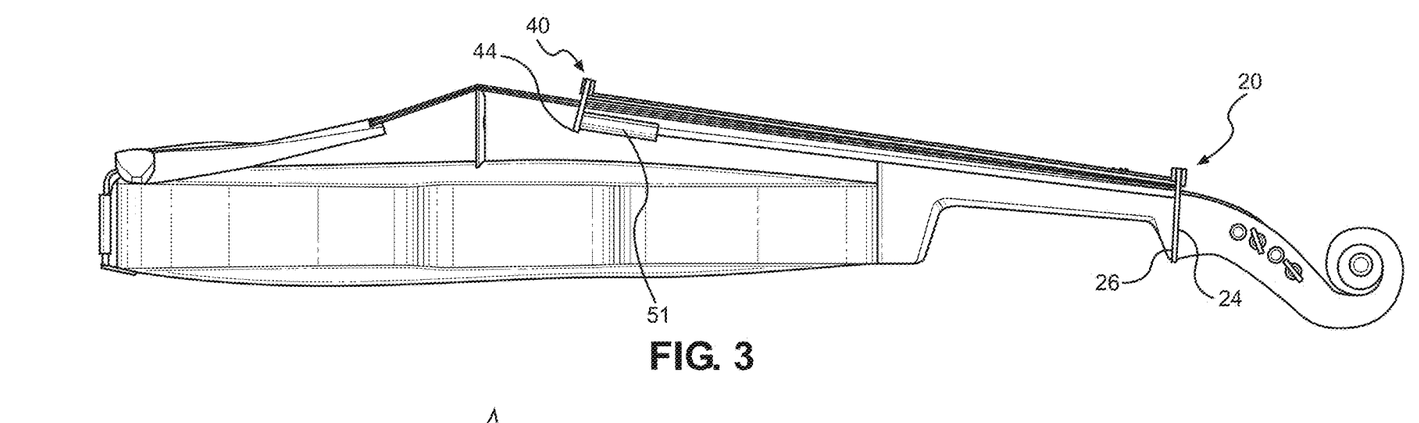
FIG. 3 is a side view of the tactile guidance system for string instruments of FIG. 1.
Figure 4:
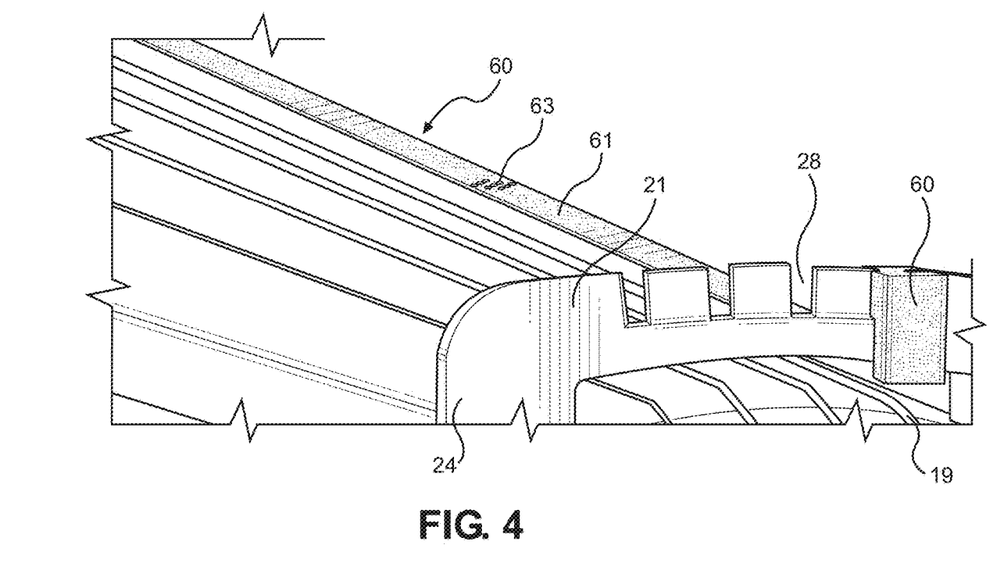
FIG. 4 is a close-up perspective view of the tactile indicator on a tactile band of the tactile guidance system for string instruments of FIG. 1.
Figure 5:
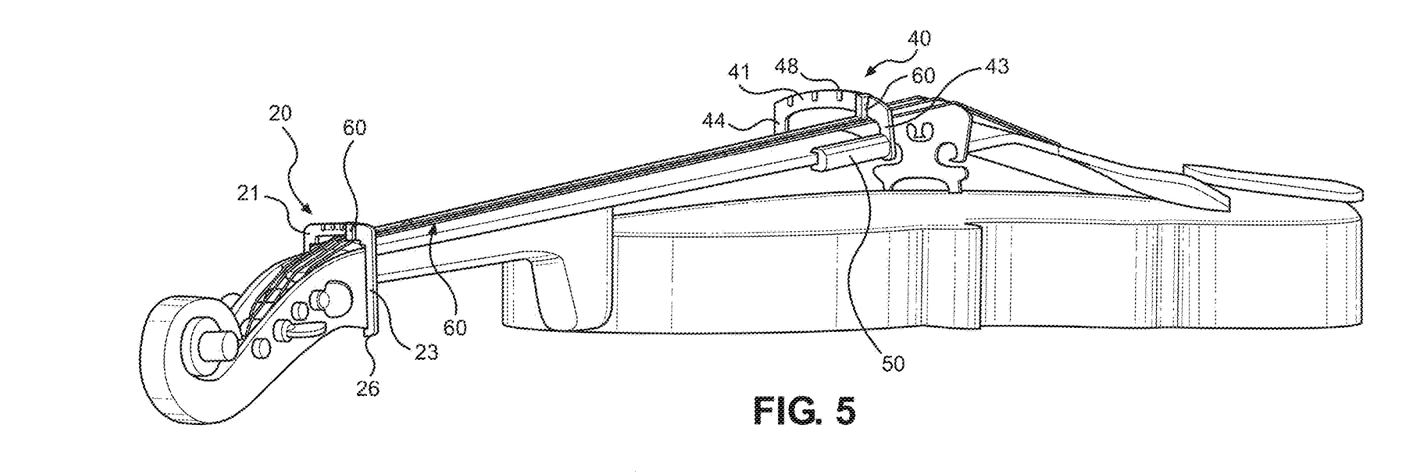
FIG. 5 is a front perspective view of the tactile guidance system for string instruments of FIG. 1.
Figure 6:
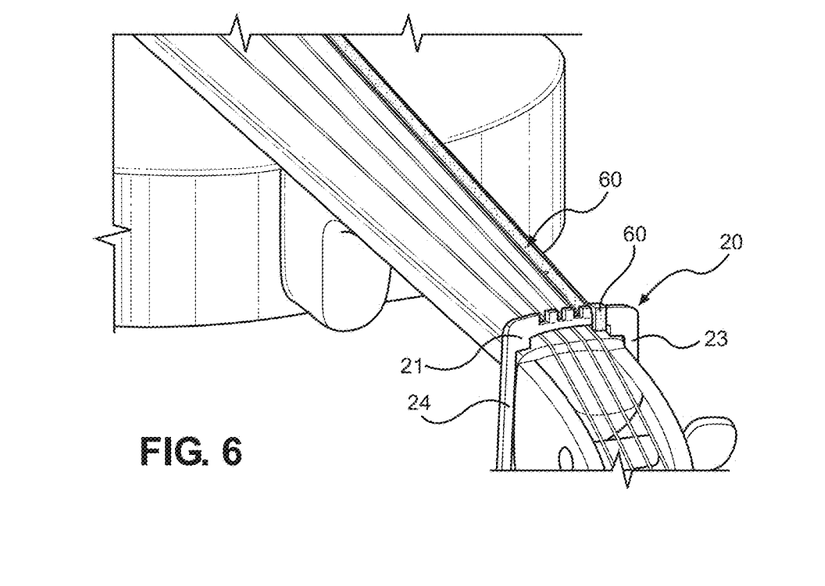
FIG. 6 is a perspective partial view of the tactile guidance system for string instruments of FIG. 1.
Figure 7:
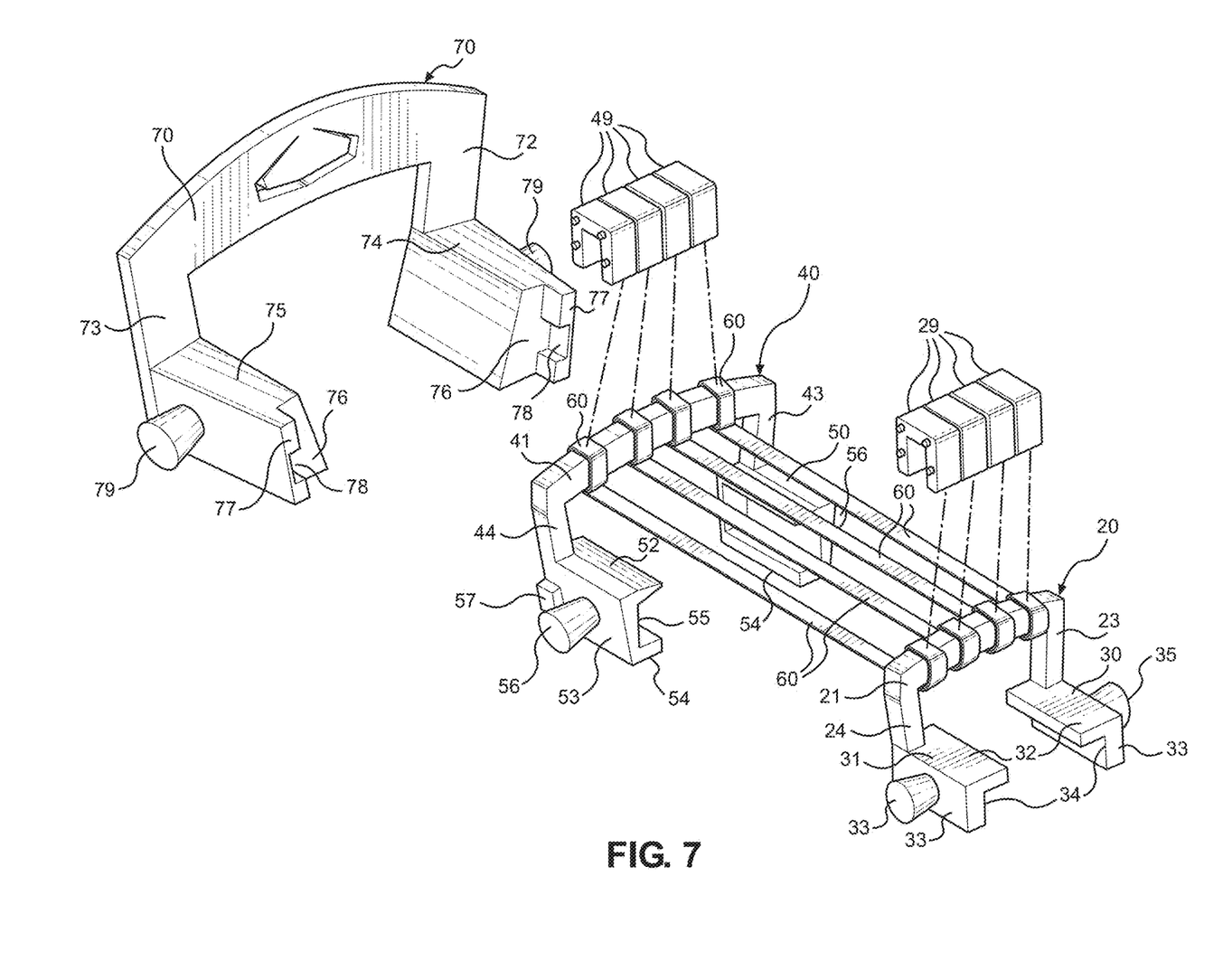
FIG. 7 is a perspective view of a tactile guidance system for string instruments as applied to a string instrument wherein the tactile guidance system additionally includes a bow barrier in accordance with an example embodiment.
Figures 8A, 8B, 8C:
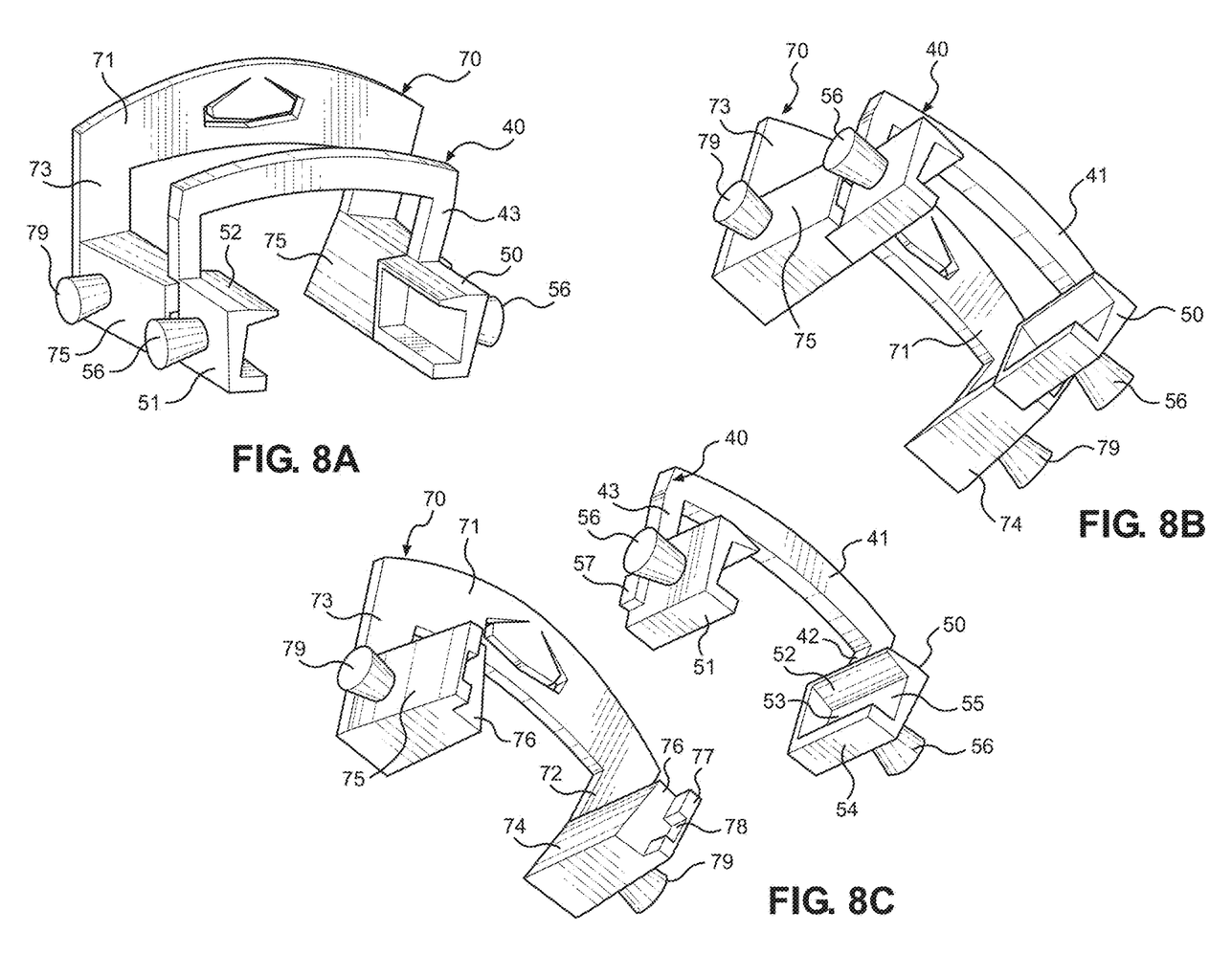
FIGS. 8A, 8B, and 8C are perspective views of the bow barrier and a lower band support structure of the tactile guidance system for string instruments of FIG. 7.
Figure 9:
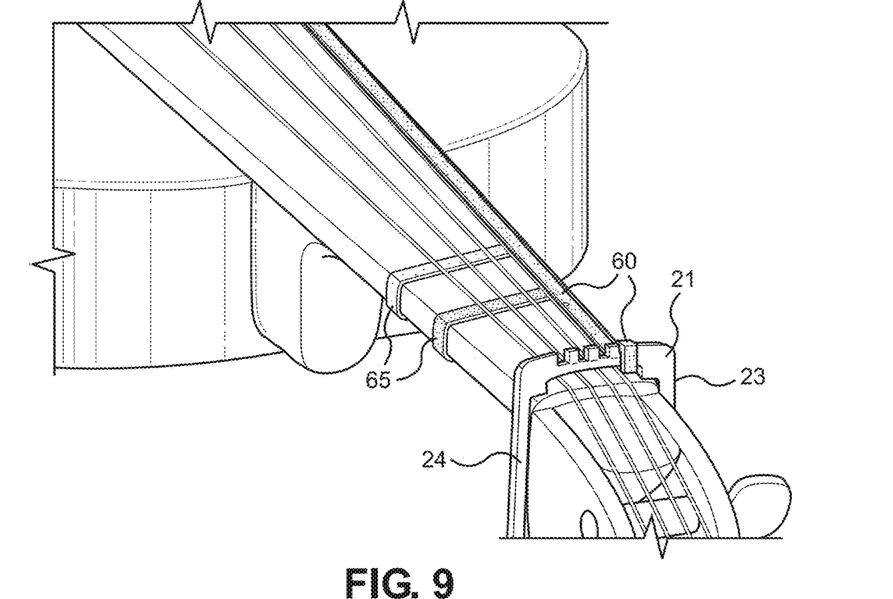
FIG. 9 is a perspective view of neck indicators that can be used in combination with the tactile guidance system for string instruments.
Figure 10:
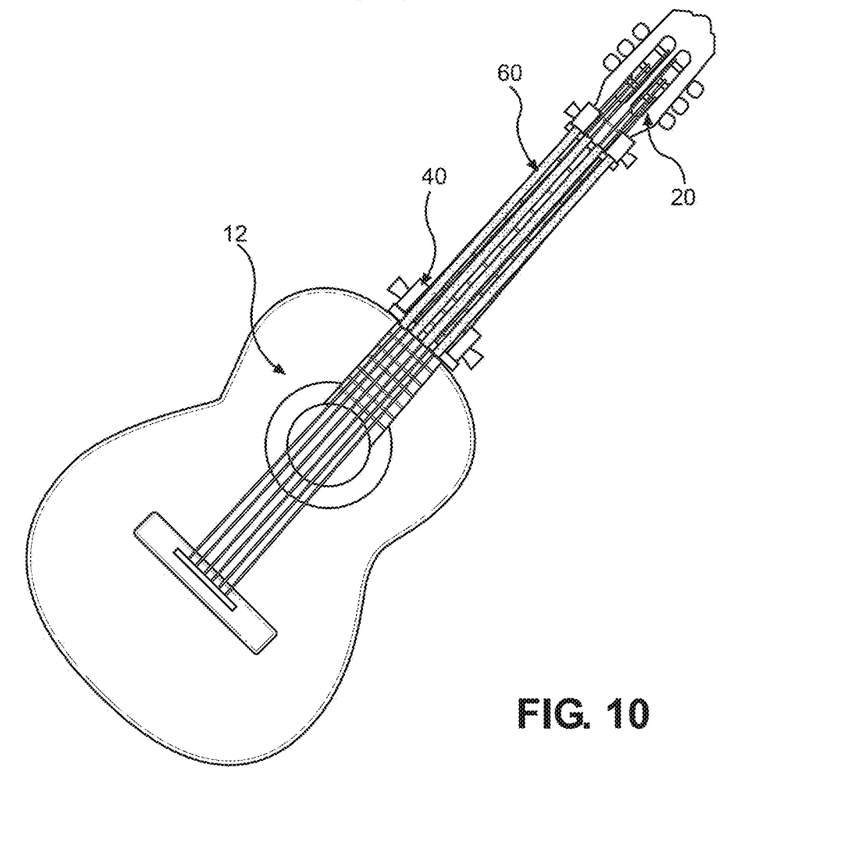
FIG. 10 is a perspective view of a tactile guidance system for string instruments as applied to a string instrument with frets in accordance with an example embodiment.
Figure 11:
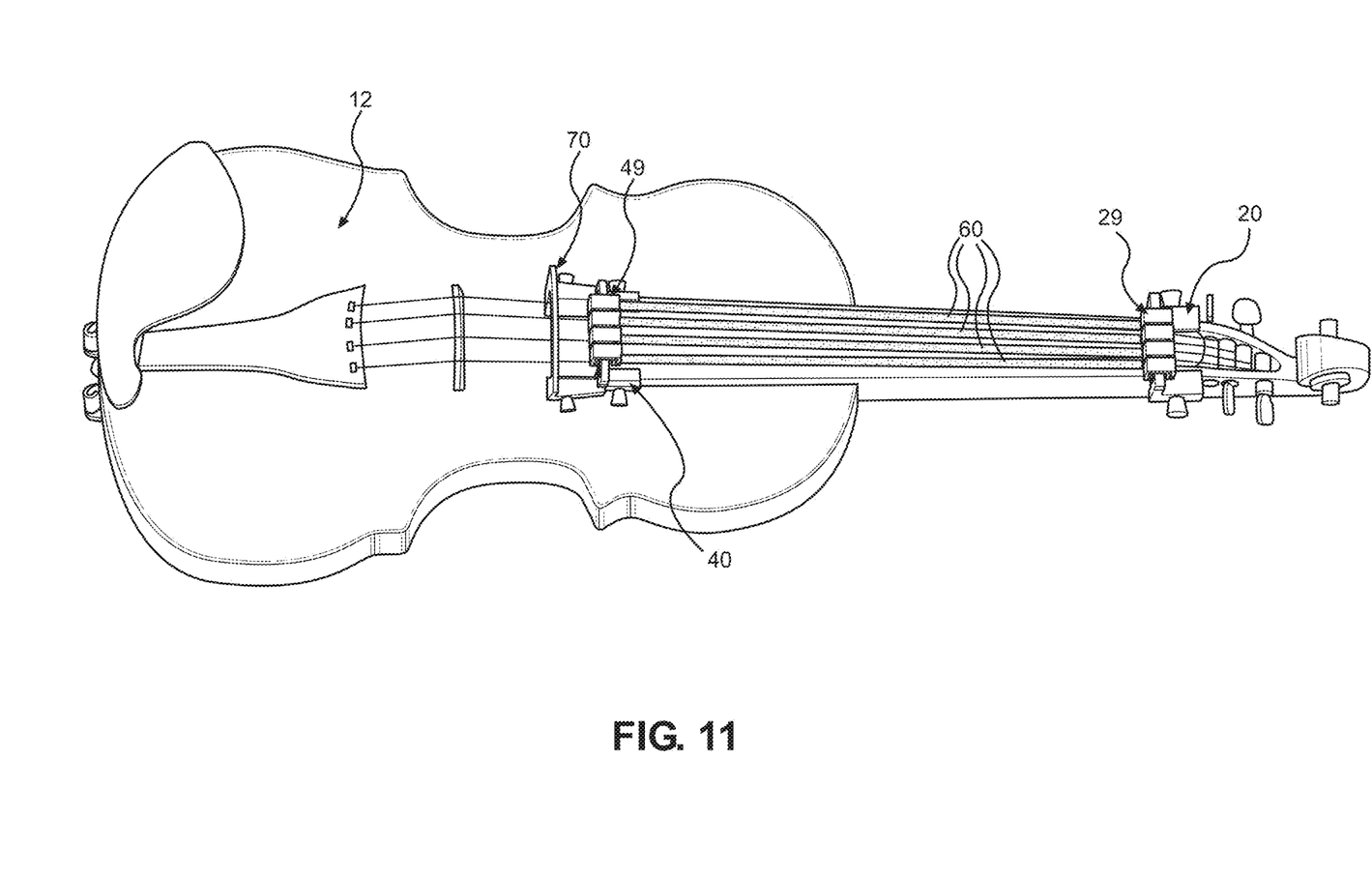
FIG. 11 is a top perspective view of the tactile guidance system for string instruments of FIG. 7 as applied to a string instrument.

FIGS. 7, 10, and 11 illustrate an alternative configuration of the upper band support structure 20 wherein the first wrap portion and the second wrap portion 26 are replaced with a respective first side clamp 30 and a second side clamp 31, each of which is a two-wall configuration having an upper wall 32 and a side wall 33. The side wall 33 forms a right angle with the upper wall 32 to define a right angle cavity 34 whereby the upper walls 32 are positionable atop the upper end of the fingerboard 17 of the string instrument 12 and the side walls 33 are positionable immediately proximate the neck 16 of the string instrument upon return from outward flexing of the first side member 23 and the second side member 24; return from outward flexing positions the upper band support structure 20 about the string instrument 12. In certain embodiments, one or both of the first side clamp 30 and the second side clamp 31 are equipped with a tab 35, which is finger-grabbable, to facilitate the outward flexing of the first side member 23 and/or second side member 24.

It should be noted that, in the instance that the string instrument 12 is an instrument that includes a fretboard (e.g., such as a guitar, banjo, mandolin, ukelele, etc.) rather than a fretless fingerboard 17, the upper walls 32 of the first side clamp 30 and the second side clamp 31 are positionable atop the fretboard as shown in FIG. 10. It should also be noted, that in certain embodiments, one or both of the first side clamp 30 and second side clamp 31 may include a third wall similar to the configuration of the lower band support structure 40 described herein to create a u-shaped cavity to provide a three-sided grip about the fingerboard 17 (or fretboard).

Figure 12:
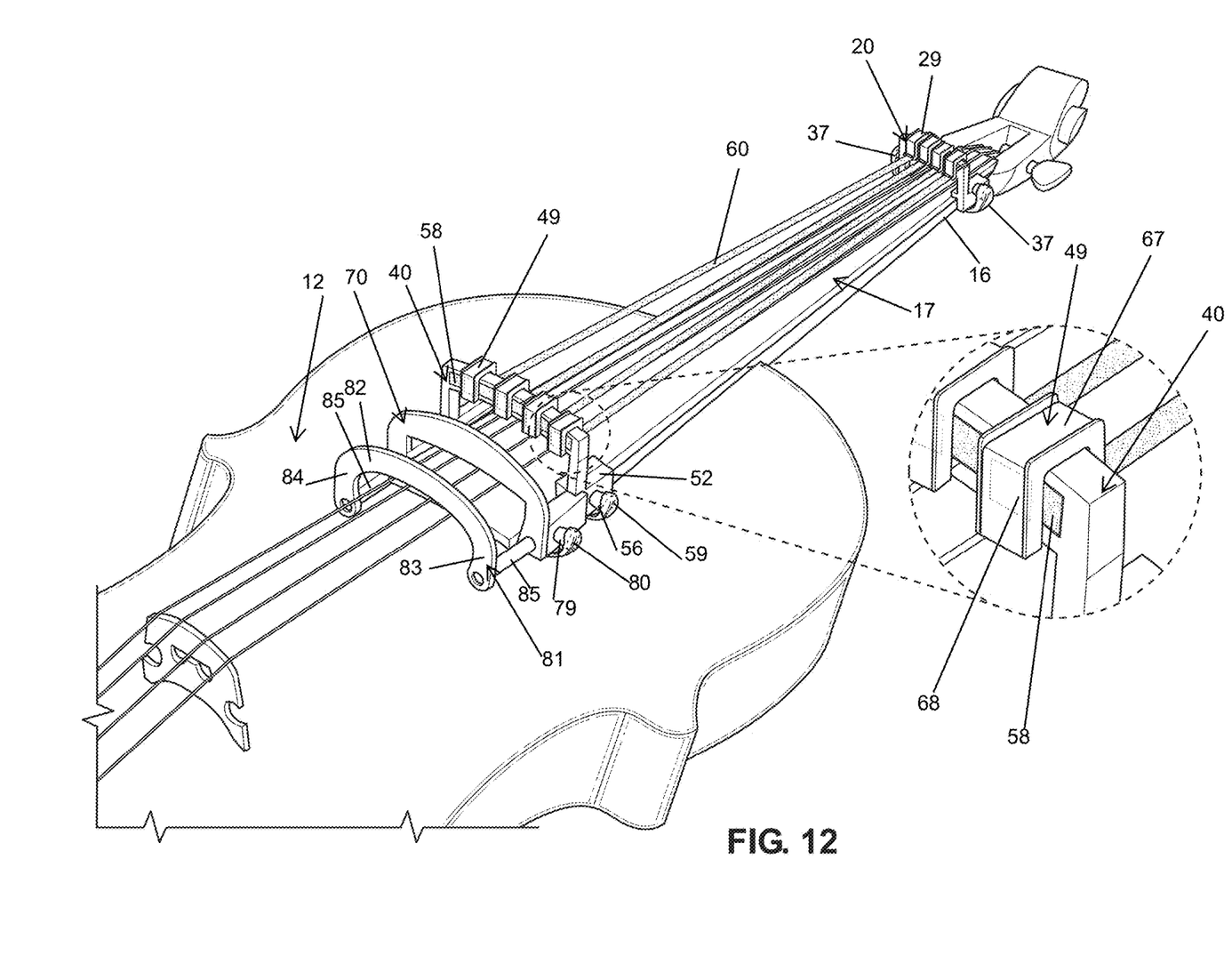
FIG. 12 is a top perspective view of a tactile guidance system for string instruments as applied to a string instrument.

FIG. 12 illustrates another alternative configuration of the upper band support structure 20 wherein the upper walls 32 of each of the first side clamp 30 and the second side clamp 31 simply rest atop the upper end 17a of the fingerboard 17 and the side walls 33 of each of the first side clamp 30 and the second side clamp 31 rest proximate the neck 16 of the string instrument 12. In this configuration, an elastic band 37 extends from the tab 35 on the first side clamp 30 underneath the neck 16 of the string instrument 12 to the tab 35 of the second side clamp 31 with the tension of the elastic band 37 functioning to removably secure the upper band support structure 20 to the string instrument 12. In this configuration, the upper band support structure 20 additionally includes a ferromagnetic material (not shown) in the upper cross portion 21 to interface with a magnet within each of the band clamps 49; further detail regarding the ferromagnetic material and magnetic band clamps are further described herein below.

C. Lower Band Support Structure

The exemplary lower band support structure 40 of the tactile guidance system for string instruments 10 depicted in FIGS. 1-11 is similar to the upper band support structure 20 in that the lower band support structure 40 is preferably of a unitary configuration and is fabricated from a plastic material such as, without limitation, one or more of polypropylene, polyethylene, polystyrene, polyvinyl chloride, polycarbonate, polyethylene terephthalate, and/or synthetic or semi-synthetic materials that can produce the lower band support structure 40 with desired levels of rigidity and flexibility for removably or fixedly securing about a string instrument 12; rubber, metal, and wood are also possible materials.

Further, the lower band support structure 40 also includes an upper cross portion 41 in a substantially horizontal orientation, having an arched or flat upper surface corresponding to the shape of the fingerboard/fretboard 17, that is supported by a first side member 43 and a second side member 44, each of which is oriented substantially perpendicularly to the upper cross portion 41. However, with the lower band support structure 40, each of the first side member 43 and the second side member 44 extend to a respective first side clamp 50 and a second side clamp 51, each of which includes an upper wall 52, side wall 53, and lower wall 54 that join together to form a u-shaped cavity 55.

The first side member 43 and the second side member 44 of the lower band support structure 40 can be flexed outward to accommodate the placement of the lower support structure 40 about a lower end 17b of the fingerboard 17 of the string instrument 12. The return of the first side member 43 and the second side member 44 from the outward flex results with the sides of the lower end of the fingerboard 17 positioned within the u-shaped cavity 55 of the first side clamp 50 and the second side clamp 51. The u-shaped cavity 55 then presents the upper wall of the 52 of the first side clamp 50 and the second side clamp atop the fingerboard 17, the side wall 53 of the first side clamp 50 and the second side clamp 51 immediately proximate the side/edge of the fingerboard 17, and the lower wall of the first side clamp 50 and the second side clamp 51 immediately beneath the fingerboard 17; the upper cross portion 41 of the lower band support structure 40 is presented in a position above the strings 19 of the string instrument 12. In certain embodiments, each of the first side clamp 50 and the second side clamp 51 are equipped with a tab 56, which is finger-grabbable, to facilitate the outward flexing of the first side member 43 and second side member 44.

In FIGS. 1-6, as with the upper band support structure 20, the upper cross portion of the lower band support structure 40 is provided with one or more notches 48 about which an end of the tactile band 60 can be wrapped and secured within. In other embodiments, see, for example, FIG. 7, the notches are eliminated and the upper cross portion 41 is provided with an un-notched surface about which the end of the tactile band 60 is wrapped. A band clamp 49, seen in FIGS. 7 and 11, can be used in conjunction with the notched or un-notched upper cross portion 41 to further secure the end of the tactile band 60 at the lower band support structure 40 in a position above the string 19 of the string instrument 12. The illustrated band clamp 49 is generally an inverted u-shaped plastic component that slides over the end of the tactile band 60 in an interference fit allowing for removal and/or replacement of the band clamp 49. The band clamp 49 may include a tacky or textured surface to enhance its grip about the end of the tactile band 60 and upper cross portion 41. The lower band support structure 40 itself may also include a tacky or textured surface to enhance its grip about the fingerboard 17.

In certain embodiments, each of the first side clamp 50 and the second side clamp 51 of the lower band support structure 40 includes a projection 57 at a rear of the side wall 53 serving as an interface for aligning and attaching a bow barrier 70 (depicted in FIGS. 7-9 and 11-12 and described further herein) to the lower band support structure 40.

It should be noted that, in the instance that the string instrument 12 is an instrument that includes a fretboard (e.g., such as a guitar, banjo, mandolin, ukelele, etc.) rather than a fretless fingerboard 17, the upper walls 52 of the first side clamp 50 and the second side clamp 51 are positionable atop the fretboard as shown in FIG. 10.

FIG. 12 illustrates another alternative configuration of the lower band support structure 40 wherein the upper walls 52 of each of the first side clamp 50 and the second side clamp 51 simply rest atop the lower end 17b of the fingerboard 17 and the side walls 53 of each of the first side clamp 50 and the second side clamp 51 rest proximate the side edge of the fingerboard 17 of the string instrument 12. In this configuration, an elastic band 59 extends from the tab 56 on the first side clamp 50 underneath the lower end 17b of the fingerboard 17 of the string instrument 12 to the tab 56 of the second side clamp 51 with the tension of the elastic band 59 functioning to removably secure the lower band support structure 40 to the string instrument 12. In this configuration, the lower band support structure 40 additionally includes a ferromagnetic material 58 in the upper cross portion 41 to interface with a magnet within each of the band clamps 49; further detail regarding the magnetic band clamps are further described herein below.

D. Tactile Band

One or more tactile bands 60, e.g., four tactile bands 60 for a four-stringed instrument or six tactile bands for a six-stringed instrument, are included in the tactile guidance system for string instruments 10. Each of the tactile bands 60 is preferably made of a flexible and/or stretchable material that is capable of flexing and/or stretching then returning to its original unflexed/unstretched configuration. The flexible and/or stretchable material can comprise one or more, without limitation, elastomers such as natural rubber, synthetic rubber, silicone, and polyurethane.

Each of the tactile bands 60 is of a length suitable to the instrument to which it is being applied that allows the tactile bands 60 to extend between the upper band support structure 20 and the lower band support structure 40. Sufficient additional length is provided at each of the upper end 61 and the lower end 62 of the tactile band 60 so as to enable the upper end 61 and the lower end 62 of the tactile band 60 to engage and/or wrap about the upper band support structure 20 and the lower band support structure 40 (in either of a notched or unnotched configuration). If desired and/or necessary, a band clamp 29 can be placed about the engaged tactile band 60 at the upper band support structure 20 and lower band support structure 40 to more firmly secure the respective upper end 61 and the lower end 62 of the tactile band 60.

Each of the tactile bands 60 is preferably provided with one or more tactile indicators 63 that indicate to the user the correct positioning of a finger to obtain a desired predetermined note upon the user depressing, with their finger, the tactile indicator 63. Depression of the tactile indicator 63 causes depression of the tactile band 60 and depression of the underlying string 19 against the fingerboard 17 of the string instrument 12. In certain embodiments, the tactile band 60 is provided with a plurality of tactile indicators 63 for finger positioning of a corresponding plurality of predetermined notes (a singular tactile indicator 63 on the tactile band 60 can be depressed or a plurality of tactile indicators 63 on the tactile band can be depressed simultaneously). In certain embodiments, each of the plurality of tactile indicators 63 on the tactile band 60 is different from the other of the plurality of tactile indicators 63 on the tactile band 60 while in other embodiments the tactile indicators 63 are the same at different locations along the tactile band 60. In certain embodiments, each of a plurality of the tactile bands 60 are configured with one or more tactile indicators 63 that are different from the tactile indicators 63 found on another of the plurality of tactile bands 60 for a particular instrument.

The one or more tactile indicators 63 on the respective tactile band 60 may be any kind of shape or texture that rises above the upper surface 64 of the tactile band 60. In a preferred embodiment, the tactile indicators 63 are unitary with the tactile band 60 while in other embodiments the tactile indicators 63 are positioned atop the tactile band 60 after manufacture of the tactile band 60 where the tactile indicators 63 are glued or otherwise attached to the tactile band. In certain embodiments, the one or more tactile indicators 63 may additionally be color-coded for additional visual recognition beyond tactile recognition by the user. Because correct positioning of the tactile indicator 63 above the underlying string 12 is key to finger placement and production of a desired note, it is preferable that a skilled musician with knowledge in playing the instrument 12 to which the tactile band 60 is being applied use their knowledge for the tactile band 60 and tactile indicator 63 positioning. In certain embodiments, to assist in correct placement of the tactile band 60 and the tactile indicators 63, one or more location indicators 65 (e.g., colored tape or the like) may be placed directly on the fingerboard 17 to indicate a location for placement of a tactile indicator 63; see, for example, FIG. 9.

FIG. 12 illustrates an alternative configuration wherein the upper end 61 and the lower end 62 of the tactile band 60 are wrapped about an interior surface (not shown) of a respective band clamp 29, 49 and covered with an outer shell 67 that conceals the end 61, 62 of the respective tactile band 60. The outer shell 67 additionally serves to conceal a magnet 68 within the respective band clamp 29, 49; the magnet 68 magnetically interfaces with the ferromagnetic material 58 in the upper band support structure 20 or lower band support structure 40 to hold the tactile band 60 in a correct position, with respect to the tactile indicators 63 of the tactile band 60, relative to a respective one of the strings 19 of the string instrument 12.

E. Bow Barrier

In certain embodiments, the tactile guidance system for string instruments 10 can additionally include a bow barrier 70 that is positionable behind the lower band support structure 40. The bow barrier 70 assists a user in positioning a bow at a correct location on the strings 19 of the instrument 12 with that correct location being between the bow barrier 70 and the bridge 18 of the instrument 12. Further, the bow barrier 70 assists a user in drawing a straight bow with the appropriate inclination (i.e., the inclination or angle of the bow is constrained by the bow barrier 70 to a position where the bow is slightly tilted away from the bridge 18 towards the scroll 13). FIGS. 7, 8A-8C, and 11 illustrate an example embodiment of the bow barrier 70.

The bow barrier 70 is configured similarly to the upper band support structure 20 and the lower band support structure 40 in that the bow barrier is preferably of a unitary configuration and is fabricated from a plastic material such as, without limitation, one or more of polypropylene, polyethylene, polystyrene, polyvinyl chloride, polycarbonate, polyethylene terephthalate, and/or synthetic or semi-synthetic materials that can produce the bow barrier 70 with desired levels of rigidity and flexibility that it might be removably secured to the lower band support structure 40; rubber, metal, and wood are also possible materials.

The bow barrier 70 includes an upper cross portion 71 in a substantially horizontal orientation that has an arched or flat upper surface corresponding to the shape of the fingerboard/fretboard 17. The upper cross portion 71 of the bow barrier is supported by a first side member 72 and a second side member 73, each of which is oriented substantially perpendicularly to the upper cross portion 71. Each of the first side member 72 and the second side member 73 extend to a respective first base member 74 and a second base member 75. Each of the first base member 74 and second base member 75 includes a recessed front surface 76 proximate an end portion 77 that includes a slot 78 to receive the projection 57 of the lower band support member 40 and secure the bow barrier 70 to the lower band support structure 40. In certain embodiments, each of the first base member 74 and the second side base member 75 are equipped with a tab 77, which is finger-grabbable, to facilitate the outward flexing of the first side member 72 and second side member 73 to assist in positioning the bow barrier 70 about the lower band support member 40.

Referring to FIG. 12 and an alternative configuration of the bow barrier 70, the first side member 72 and the second side member 73 of the bow barrier 70 rest atop the fingerboard 17 while an elastic band 80 extends from the tab 77 of the first side member 74 underneath the fingerboard 17 to the tab 77 of the second side base member 75 to removably secure the bow barrier 70 to the fingerboard 17 of the string instrument 12. The bow barrier 70 of FIG. 12 additionally includes a second portion 81, similarly configured to the bow barrier 70, with an upper cross portion 82 substantially parallel to the upper cross portion 71 of the bow barrier 70. A first side member 83 and a second side member 84 support the upper cross portion 82. Each of the first side member 83 and the second side member 84 are permanently or removably secured to the bow barrier 70 by cross-arm 85. The bow barrier 70 in combination with the second portion 81 of the bow barrier 70 serve to define a channel at the appropriate position on the string instrument 12 through which a bow used to the play string instrument can be correctly positioned and drawn.

F. Operation of Preferred Embodiment

In use, a string instrument 12 is equipped with the tactile guidance system for string instruments 10 by first positioning the upper band support structure 20 and the lower band support structure 40 about the neck 16 and fingerboard 17 of the string instrument 12.

In placing the upper band support structure 20, the first side member 23 and the second side member 24 are flexed outward to accommodate the width of the neck 16 of the string instrument so as to allow the first wrap portion and the second wrap portion 26 to slip immediately under the neck 16 proximate the peg box 14; the flex of the upper band support structure 20 is released to allow the upper band support structure a tight fit about the neck 16. In an alternative configuration (see FIGS. 7 and 11), upon the outward flexing of the first side member 23 and the second side member 24, the first side clamp 30 and the second side clamp 31 of the upper band support structure 20 are positioned with the upper wall 32 of the first side clamp 30 and the second side clamp 31 atop the fingerboard 17 and the side wall 33 immediately proximate the neck 16 in a right angle orientation to the upper wall 32. In still another configuration, see FIG. 12, the first side clamp 30 and the second side clamp 31 rest atop the fingerboard 17 and are removably secured thereto with the elastic band 37 that extends under the neck 16 of the string instrument 12 coupling the tab 35 of the first side clamp 30 to the tab 35 of the second side clamp 31.

In placing the lower band support structure 40, the first side member 43 and the second side member are flexed outward to accommodate the width of the fingerboard 17, e.g., the broadest width of the fingerboard 17, at the lower end of the fingerboard 17. The flex of the lower band support structure 40 is released allowing the u-shaped cavity 55 of the first side clamp 50 and the second side clamp 51 to fit tightly about fingerboard 17 with the upper wall 52 of each of the clamps resting on the fingerboard 17, the side wall 53 of the each of clamps positioned immediately to the side of the fingerboard 17, and lower wall 54 of each of the clamps positioned immediately underneath the fingerboard 17. In still another configuration, see FIG. 12, the first side clamp 50 and the second side clamp 51 rest atop the fingerboard 17 and are removably secured thereto with the elastic band 59 that extends under the fingerboard 17 of the string instrument 12 coupling the tab 56 of the first side clamp 50 to the tab 56 of the second side clamp 51.

One or more of the tactile bands 60 is then stretched tautly between the upper band support structure 20 and the lower band support structure 40 with the upper end 61 of the tactile band 60 wrapped about and secured to the upper cross portion 21 of the upper band support structure 20; securing of the upper end 61 of the tactile band is achieved through use of one of the notches in the upper cross portion 21 and/or one of the band clamps 29 positioned about the wrapped upper end 61 of the tactile band 60 and press fit about the upper cross portion. The lower end 62 of the tactile band 60 is similarly secured about the lower band support structure 40. This procedure can be completed for each of the tactile bands 60 that is desired to be used with the string instrument. Notably, in certain embodiments, each of the upper band support structure 20 and the lower band support structure 40 is preferably configured to accommodate as many tactile bands 60 as there are strings on the string instrument 12. In an alternative embodiment (see FIG. 12), the upper end 61 of the tactile band 60 is wrapped about the band clamp 29 itself and the lower end 62 of the tactile band 60 is wrapped about the band clamp 49 itself wherein the magnet 68 within the respective band clamp 29,49 interfaces with the ferromagnetic material 58 in the upper band support structure 20 and the lower band support structure 40, respectively, to hold the tactile band 60 in a desired position.

In placing the tactile band 60 relative to the upper band support structure 20 and the lower band support structure 40, care is given to the positioning the one or more tactile indicators 63 on the tactile band 60 at a location relative to the fingerboard 17 such that when the tactile indicator 63 of the tactile band 60 and the underlying string 19 of the string instrument 12 are depressed by a user's finger a desired and accurate note (e.g., accurate pitch and intonation) will be produced when drawing a bow across the respective string 19 at a position near the bridge 18 (or when plucking the string 19). In the instance of a guitar (or other instrument with a fretboard), a desired and accurate note (e.g., pitch and intonation) will be produced by strumming, picking, or plucking the string 19.

If desired, the bow barrier 70, with or without the second portion 81 of the bow barrier 70 (see FIG. 12), may also be attached to the lower band support structure 40 by flexing the first side member 72 and second side member 73 outward and released so as to enable each of the first base member 74 and the second base member 75 to rest atop the body 11 of the string instrument 12 and so as to enable to enable the slot 78 in each of the first base member 74 and the second base member 75 to receive the projections 57 of the lower band support member 40 and, essentially, removably lock the bow barrier 70 in position relative to the lower band support member 40.

Each of the upper band support member 20, lower band support member 40, tactile bands 60, and bow barriers 70 are sized specifically to accommodate at least one size of a string instrument (e.g., violins are manufactured in multiple sizes). However, it is possible one or more of the upper band support member 20, lower band support member 40, tactile bands 60, and bow barriers 70 can accommodate more than one size of a string instrument 12 and/or different string instruments 12 (e.g., a violin and a viola). It is also possible that the upper band support member 20, lower band support member 40, and bow barriers 70 can accommodate more than one size of a string instrument 12 and/or different string instruments 12 in conjunction with different sets of tactile strings 60 that are made specific to a string instrument 12.

In the preferred embodiment, the tactile guidance system for string instruments 10 is removably secured to the string instrument, however, it should be noted that the tactile guidance system for string instruments 10 can be fixedly secured to the instrument such as by an appropriate adhesive.

In certain embodiments, one or more of the upper band support member 20, lower band support member 40, and one or more tactile bands 60 are placed on the string instrument 12 in a position such that finger placement on a string 19 not covered by a tactile band is still possible. In certain embodiments, one or more of the tactile indicators 63 may correspond to a specific note or a combination of note patterns along a string 19 or combination of strings 19.

It should be noted that the tactile guidance system for string instruments 10 is usable to establish muscle memory in user for correct finger position. For example, prior to the suppression of the string 19 and the product of sound with a bow, the placement of a finger according to the tactile indicators 63 connects audiation of a note with the position of the fingers.

While various embodiments have been described above, it should be understood that they have been presented by way of example only allowing for features of one embodiment to be combined features of one or more other embodiments. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. A tactile guidance system for string instruments comprising:
    an upper band support structure positioned about a plurality of strings of a string instrument and positioned about an upper end of a fingerboard of the string instrument;
    a lower band support structure positioned about the plurality of strings of the string instrument and positioned about a lower end of the fingerboard of the string instrument; and
    a tactile band secured between the upper band support structure and the lower band support structure in a position above an underlying one of the plurality of strings, wherein the tactile band includes a tactile indicator that is depressible by a finger of a user causing depression of the tactile band and causing depression of the underlying one of the plurality of strings against the fingerboard at a predetermined musical note position.

2. The tactile guidance system of claim 1, further comprising a plurality of tactile bands secured between the upper band support structure and the lower band support structure.

3. The tactile guidance system of claim 2, wherein the plurality of tactile bands comprises a number of tactile bands that are equivalent to a number of strings on the string instrument.

4. The tactile guidance system of claim 1, wherein the tactile band includes a plurality of tactile indicators, wherein at least a portion of the plurality of tactile indicators represent a corresponding plurality of predetermined musical note positions.

5. The tactile guidance system of claim 4, wherein one of the portion of the plurality of tactile indicators are of a different shape than another one of the portion of the plurality of tactile indicators.

6. The tactile guidance system of claim 4, wherein one of the portion of the plurality of tactile indicators are of a different texture than another one of the portion of the plurality of tactile indicators.

7. The tactile guidance system of claim 1, wherein the tactile indicator includes a visual indicator in a form of a color or shape.

8. The tactile guidance system of claim 1, wherein a first end of the tactile band is secured at a notch in the upper band support structure and wherein a second end of the tactile band is secured at a notch in the lower band support structure.

9. The tactile guidance system of claim 1, wherein a first end of the tactile band is secured at the upper band support structure with a first band clamp and wherein a second end of the tactile band is secured at the lower band support structure with a second band clamp.

10. The tactile guidance system of claim 9, wherein each of the first band clamp and the second band clamp magnetically couplable to the upper band support structure and the lower band support structure.

11. The tactile guidance system of claim 1, wherein the string instrument comprises one of a violin, a viola, a cello, or a double bass.

12. The tactile guidance system of claim 1, wherein the fingerboard is in a form of a fretboard and wherein the string instrument comprises one of a guitar, banjo, or ukelele.

13. A tactile guidance system for string instruments comprising:

an upper band support structure positioned about a plurality of strings of a string instrument and positioned about an upper end of a fingerboard of the string instrument;

a lower band support structure positioned about the plurality of strings of the string instrument and positioned about a lower end of the fingerboard of the string instrument;

a tactile band secured between the upper band support structure and the lower band support structure in a position above an underlying one of the plurality of strings, wherein the tactile band includes a tactile indicator that is depressible by a finger of a user causing depression of the tactile band and causing depression of the underlying one of the plurality of strings against the fingerboard at a predetermined musical note position; and a bow barrier coupled to the lower band support structure, wherein the bow barrier assists in positioning a bow used to play the string instrument at predetermined angle.

14. The tactile guidance system of claim 13, further comprising a plurality of tactile bands secured between the upper band support structure and the lower band support structure.

15. The tactile guidance system of claim 14, wherein the plurality of tactile bands comprises a number of tactile bands that are equivalent to a number of strings on the string instrument.

16. The tactile guidance system of claim 13, wherein the tactile band includes a plurality of tactile indicators, wherein at least a portion of the plurality of tactile indicators represent a corresponding plurality of predetermined musical note positions.

17. The tactile guidance system of claim 13, wherein the bow barrier includes a second portion oriented parallel to the bow barrier that, along with the bow barrier, defines a channel through which a bow used to play a string instrument can be drawn.

18. The tactile guidance system of claim 13, wherein a first end of the tactile band is secured at the upper band support structure with a first band clamp and wherein a second end of the tactile band is secured at the lower band support structure with a second band clamp.

19. The tactile guidance system of claim 13, wherein the string instrument comprises one of a violin, a viola, a cello, or a double bass.

20. A tactile guidance system for string instruments comprising:

an upper band support structure positioned about a plurality of strings of a string instrument and positioned about an upper end of a fingerboard of the string instrument;

a lower band support structure positioned about the plurality of strings of the string instrument and positioned about a lower end of the fingerboard of the string instrument; and a plurality of tactile bands secured between the upper band support structure and the lower band support structure in a position above a respective underlying one of the plurality of strings, wherein at least one of the plurality of tactile bands includes a plurality of tactile indicators that are individually depressible by a finger of a user or simultaneously depressible by a plurality of fingers of the user, wherein depression of at least one of the plurality of tactile indicators causes depression of the at least one of the plurality of tactile bands and causes depression of the underlying one of the plurality of strings against the fingerboard at a predetermined musical note position.

* * * * *